United States Patent [19]

Schorr

[11] 3,919,585

[45] Nov. 11, 1975

[54] ENCAPSULATION FOR LIGHT EMITTING ELEMENT PROVIDING HIGH ON-OFF CONTRAST

[75] Inventor: Anthony Joseph Schorr, Birdsboro, Pa.

[73] Assignee: Bell Telephone Laboratories, Incorporated, Murray Hill, N.J.

[22] Filed: May 24, 1974

[21] Appl. No.: 473,071

[52] U.S. Cl. ................ 313/499; 313/111; 313/113; 313/512

[51] Int. Cl.$^{2}$ .......................................... H05B 33/02

[58] Field of Search ........... 313/499, 512, 116, 113, 313/111, 498; 240/2.1; 357/17

[56] References Cited

UNITED STATES PATENTS

| | | | |
|---|---|---|---|
| 2,706,262 | 4/1955 | Barnes | 313/116 |
| 2,963,611 | 12/1960 | Meister et al. | 313/116 |
| 3,322,992 | 5/1967 | Parker et al. | 313/111 |
| 3,488,485 | 1/1970 | McGann | 240/106 X |
| 3,780,357 | 12/1973 | Haitz | 313/498 X |
| 3,786,499 | 1/1974 | Jankowski et al. | 313/512 X |
| 3,821,775 | 6/1974 | Biard | 357/17 |

OTHER PUBLICATIONS

IBM Technical Disclosure Bulletin, "Visible Light–Emitting Diode," by Jacobus et al., Vol. 10, No. 8, p. 1120, Jan. 1968.

*Primary Examiner*—Palmer C. Demeo
*Attorney, Agent, or Firm*—H. W. Lockhart

[57] ABSTRACT

An optical button design for a solid state light emitting element provides high ON-OFF contrast for use in well-lighted ambients. The light emitting element, mounted typically in a parabolic reflector, is closely surrounded, for example within the reflector bowl, by a moldable epoxy containing a substantially uniform dispersion of light dispersive particles. The rest of the button structure comprises an epoxy containing a neutral density agent which produces the resultant characteristic that internally generated light is emitted with a minimum of absorption while at the same time being highly absorbent of external light.

1 Claim, 2 Drawing Figures

ENCAPSULATION FOR LIGHT EMITTING ELEMENT PROVIDING HIGH ON-OFF CONTRAST

This invention relates to an encapsulation for a solid state light emitting element for use in well-lighted ambients where high ON-OFF contrast is most advantageous.

BACKGROUND OF THE INVENTION

Solid state light emitting elements fabricated from semiconductor compounds such as gallium arsenide, gallium arsenide phosphide, gallium phosphide and gallium nitride have come into wide usage for display purposes such as switchboard indicators, instrument displays and lighted pushbuttons for telephone subsets and the like. These solid state elements are most attractive for these applications because of their low power requirements and long-term reliability particularly as compared with incandescent lamps and gas tubes. The art has devoted a considerable effort to increasing the intensity and efficiency of the light output of these solid state light emitting elements by a variety of mounting arrangements and reflectors as well as by materials utilized for encapsulating the elements. However, for certain applications an increase in light intensity or output is not a complete solution to the needs of the particular use. In particular, for applications such as pushbuttons on telephone subsets or other instruments located in well-lighted ambients, there is difficulty in distinguishing between the ON and OFF conditions particularly when viewed from some distance and at lower angles of view. Accordingly, an encapsulation which enhances the ON-OFF contrast is most advantageous.

SUMMARY OF THE INVENTION

In accordance with this invention an encapsulation is provided having a high degree of ON-OFF contrast. In one aspect of the invention a moldable epoxy immediately surrounds the light emitting element which typically is a p-n junction diode of one of the semiconducting compounds noted above, which contains a substantially uniform dispersion of particles which are highly light dispersive, typically titanium dioxide particles. In one form of the invention, the diode is mounted within a metallic reflector bowl and the epoxy containing this dispersion fills the volume of the bowl and has the effect of scattering the emitted light and produces an apparent increase in the light source size and angularity.

The rest of the plastic button encapsulating the light emitting element also comprises a moldable epoxy and typically is formed to a shape consonant with its use, either as an immobile display device such as on a switchboard or as a larger plastic button suitable for movement as an actuating button as utilized on a communication instrument or subset. This remaining portion of the plastic encapsulation is compounded, before molding, with a small quantity of a neutral density agent which contributes the property to this plastic housing of transmitting the internally generated light with a minimum of absorption, while on the other hand, being highly absorbent of light impinging from the outside which might otherwise be highly reflected and emitted from the button. Thus even within well-lighted spaces, the paramount light indication associated with the button arises from the light generated by the solid state element in the ON condition. In the OFF condition, the button gives a clearly unlighted indication because of its high absorption of any light emanating from other than the solid state light emitting element.

BRIEF DESCRIPTION OF THE DRAWING

The drawing depicts in FIG. 1 a schematic cross section of an optical pushbutton encapsulation for a light emitting diode in a telephone subset.

DETAILED DESCRIPTION

Figure 1:
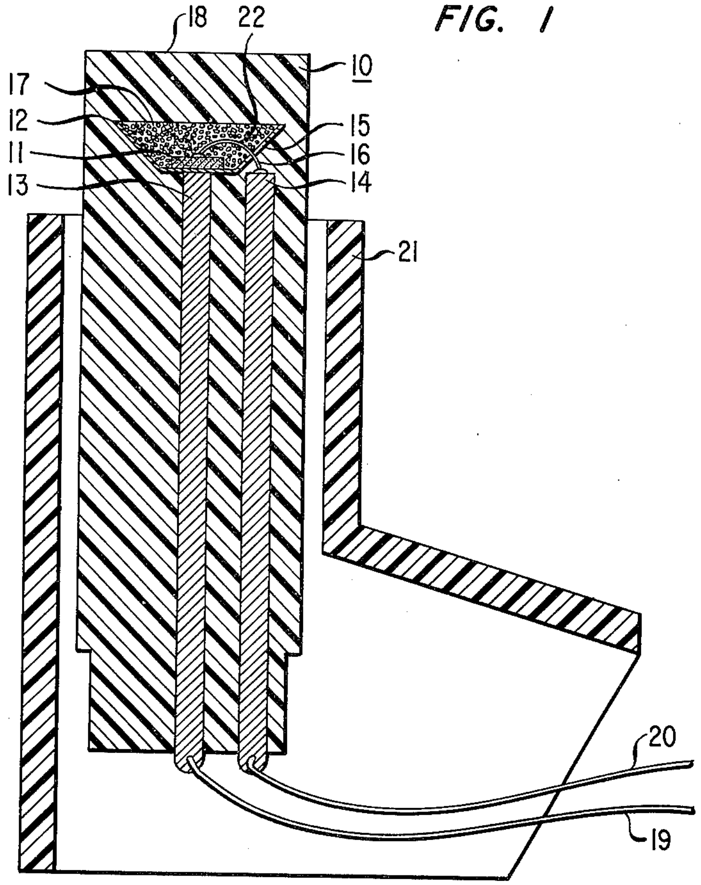
Figure 2:
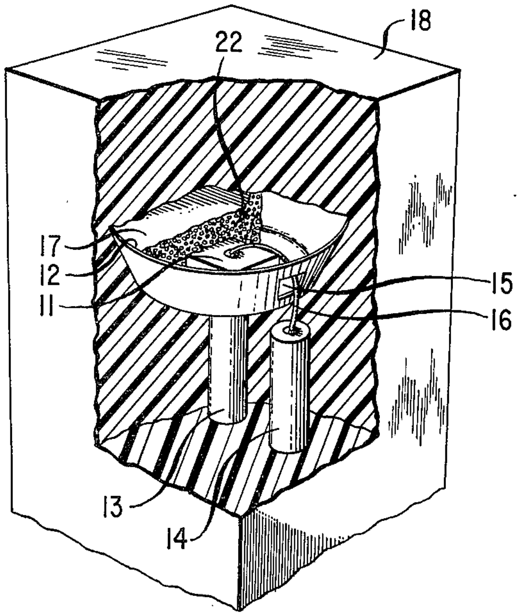
FIG. 2 is a top view in cross section of the encapsulation of FIG. 1.

Referring to the drawing there is shown a pushbutton element 10 having a square cross section. A solid state light emitting element 11 comprising a gallium phosphide p-n junction diode is mounted in the base of a metallic reflector 12 which may be of a typical parabolic configuration. Electrical connection is provided to the light emitting diode 11 by means of metallic leads 13 and 14. One side of the diode is mounted and connected to the base of the reflector 12 which in turn is directly mounted on lead 13. Connection from the opposite side of the diode is made to the lead 14 by means of the bonded wire 16 through the opening 15 in the reflector 12. The entire pushbutton 10 is provided with means for vertical movement within guideways provided within the housing 21. Electrical connection to the leads 13 and 14 may be made by flexible insulated wires 19 and 20 respectively. The details of the mounting and interconnection of the pushbutton are not shown inasmuch as they are conventional arrangements in the art and are not a part of this invention.

The encapsulants for the light emitting diode 11 comprise first the moldable epoxy portion 17 which fills the reflector bowl 12 and contains a dispersion of very small particles 22 which are highly light dispersive. These particles typically may be of titanium dioxide having an average cross section of about 0.2 micron. These particles typically are mixed in the epoxy in its liquid form and stirred to provide a substantially uniform dispersion therein. Thus, in the assembly process this epoxy containing the particles 22 is first molded within the reflector bowl 12. Surrounding the reflector bowl 12 and comprising the balance of the plastic button 10 is an additional moldable epoxy portion 18 which contains a very small percentage of a neutral density light attenuating agent. One material suitable for this purpose is identified as product CT8OT-Black available from California Titan Products Inc., Santa Ana, Calif. In a specific embodiment this agent is added in the amount of one-tenth of one percent by weight to a clear epoxy which then is molded to the desired shape around the reflector bowl 12 and metallic leads 13 and 14. This operation typically is performed by providing the leads and associated elements as a part of an assembled lead frame or by other jigging arrangements, all of which are well known in the art.

The resultant optical button 10 thus has a high degree of ON-OFF visibility as heretofore set forth by virtue of the scattering effect of the light dispersive particles immediately surrounding the light emitting element 11 while under all conditions the remainder of the plastic encapsulation comprising the neutral loaded epoxy 18 is highly absorbent of any externally originating light. More particularly, the light dispersive particles cause the light source to appear nearly uniform in intensity and of the same dimension as the diameter of the reflector bowl. With the addition of the neutral density light attenuating agent, light attenuation in the bulk plastic comprising the remainder of the button is linear with absorption for internally generated light and varies as the square of the button absorption for ambient light reflected by the internal button structure. There is as a consequence little likelihood that the viewer will be misled as to the condition of the optical button as to whether it is in the ON or OFF condition.

Although the invention has been disclosed in terms of a specific embodiment utilizing particular mounting arrangements for a particular application, it will be obvious to those skilled in the art that the structural combination disclosed herein for achieving high ON-OFF contrast may be adapted to a wide variety of arrangements.

What is claimed is:

1. A light emitting device having high ON-OFF contrast for use in a well-lighted ambient, said device comprising 1. a light source comprising a semiconductor light emitting diode,
2. a first portion of transparent moldable epoxy material surrounding and immediately adjacent said light source, said first portion containing a dispersion of light dispersive particles,
3. a second portion of transparent moldable epoxy material surrounding said first portion in which light attenuation of internally generated light varies linearly with absorption but in which the attenuation of externally generated light reflected therein varies as the square of the absorption thereof, said second portion containing a neutral density light attenuating agent comprising a darkening agent in a percentage by weight of less than one percent.

* * * * *